United States Patent
Tokuda

Patent Number: 5,897,208
Date of Patent: Apr. 27, 1999

[54] MOTOR VEHICLE TRASH BAG

[76] Inventor: Itsuo Tokuda, 424 Franklin St., Denver, Colo. 80218

[21] Appl. No.: 09/019,026
[22] Filed: Feb. 5, 1998
[51] Int. Cl.⁶ .................................................. B65D 33/02
[52] U.S. Cl. .............................. 383/34; 383/95; 383/907; 248/101
[58] Field of Search .................................. 383/33, 34, 907, 383/93, 95; 248/101, 99

[56] References Cited

U.S. PATENT DOCUMENTS

| | | | |
|---|---|---|---|
| 1,997,941 | 4/1935 | McGiff et al. | 383/34 |
| 2,079,592 | 5/1937 | Battin | 383/34 X |
| 2,778,554 | 1/1957 | Porkola | 383/33 X |
| 2,925,172 | 2/1960 | Hopp | 383/34 X |
| 3,388,882 | 6/1968 | Burroughs et al. | 383/34 X |
| 3,817,434 | 6/1974 | Dickman | 383/33 X |
| 4,848,709 | 7/1989 | Kiniry | 248/101 |
| 5,561,859 | 10/1996 | Fischer | 383/4 X |

*Primary Examiner*—Jes F. Pascua

[57] ABSTRACT

A new motor vehicle trash bag for storing garbage that has accumulated in a vehicle. The inventive device includes an interior frame member having a generally V-shaped cross-section. The interior frame member has an inverted generally U-shaped inner member. The inner member has a spring member disposed thereon. The interior frame member has an inverted generally U-shaped outer member. The outer member is secured to the spring member whereby the spring member biases the outer member outwardly with respect to the inner member. The inner member and the outer member each have a pair of clips disposed thereon. The pair of clips are adapted for holding a garbage liner therebetween in an open orientation. An exterior portion is dimensioned for receiving the interior frame member therein. The exterior portion is dimensioned for positioning beneath a seat of a vehicle.

4 Claims, 2 Drawing Sheets

MOTOR VEHICLE TRASH BAG

BACKGROUND OF THE INVENTION

1. Field of the Invention

The present invention relates to trash bag brackets and more particularly pertains to a new motor vehicle trash bag for storing garbage that has accumulated in a vehicle.

2. Description of the Prior Art

The use of trash bag brackets is known in the prior art. More specifically, trash bag brackets heretofore devised and utilized are known to consist basically of familiar, expected and obvious structural configurations, notwithstanding the myriad of designs encompassed by the crowded prior art which have been developed for the fulfillment of countless objectives and requirements.

Known prior art trash bag brackets include U.S. Pat. No. 5,246,190 to Swirkal; U.S. Pat. No. 4,280,643 to Cordova et al.; U.S. Pat. No. Des. 315,494 to Latham; U.S. Pat. No. 5,106,003 to Ma; U.S. Pat. No. 4,735,340 to Preston; and U.S. Pat. No. 4,723,740 to Courtemanche et al.

While these devices fulfill their respective, particular objectives and requirements, the aforementioned patents do not disclose a new motor vehicle trash bag. The inventive device includes an interior frame member having a generally V-shaped cross-section. The interior frame member has an inverted generally U-shaped inner member. The inner member has a spring member disposed thereon. The interior frame member has an inverted generally U-shaped outer member. The outer member is secured to the spring member whereby the spring member biases the outer member outwardly with respect to the inner member. The inner member and the outer member each have a pair of clips disposed thereon. The pair of clips are adapted for holding a garbage liner therebetween in an open orientation. An exterior portion is dimensioned for receiving the interior frame member therein. The exterior portion is dimensioned for positioning beneath a seat of a vehicle.

In these respects, the motor vehicle trash bag according to the present invention substantially departs from the conventional concepts and designs of the prior art, and in so doing provides an apparatus primarily developed for the purpose of storing garbage that has accumulated in a vehicle.

SUMMARY OF THE INVENTION

In view of the foregoing disadvantages inherent in the known types of trash bag brackets now present in the prior art, the present invention provides a new motor vehicle trash bag construction wherein the same can be utilized for storing garbage that has accumulated in a vehicle.

The general purpose of the present invention, which will be described subsequently in greater detail, is to provide a new motor vehicle trash bag apparatus and method which has many of the advantages of the trash bag brackets mentioned heretofore and many novel features that result in a new motor vehicle trash bag which is not anticipated, rendered obvious, suggested, or even implied by any of the prior art trash bag brackets, either alone or in any combination thereof.

To attain this, the present invention generally comprises an interior frame member having a generally V-shaped cross-section. The interior frame member has an inverted generally U-shaped inner member. The inner member has an upper horizontal segment and a pair of downwardly extending side components. The side components each have an upper portion and a lower portion. Each upper portion is positioned interiorly with respect to each lower portion. Free ends of the lower portion have a spring member disposed thereon. The interior frame member has an inverted generally U-shaped outer member. The outer member has an upper horizontal segment and a pair of downwardly extending linear side components. Free ends of the linear side components are secured to the spring member whereby the spring member biases the outer member outwardly with respect to the inner member. The inner member and the outer member each have a pair of clips disposed on each of the side components thereof. The pair of clips are adapted for holding a garbage liner therebetween in an open orientation. An exterior portion is dimensioned for receiving the interior frame member therein. The exterior portion has a generally L-shaped cross-section. The exterior portion has a lower horizontal portion and an upper vertical portion. The lower horizontal portion is dimensioned for positioning beneath a seat of a vehicle. The upper horizontal portion has an open upper end leading into a hollow interior. The hollow interior houses the interior frame member therein. The open upper end has hook and loop fasteners disposed on opposing sides thereof for closing the open upper end and compressing the spring member thereby pressing the outer member against the inner member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motor vehicle trash bag apparatus and method which has many of the advantages of the trash bag brackets mentioned heretofore and many novel features that result in a new motor vehicle trash bag which is not anticipated, rendered obvious, suggested, or even implied by any of the prior art trash bag brackets, either alone or in any combination thereof.

It is another object of the present invention to provide a new motor vehicle trash bag which may be easily and efficiently manufactured and marketed.

It is a further object of the present invention to provide a new motor vehicle trash bag which is of a durable and reliable construction.

An even further object of the present invention is to provide a new motor vehicle trash bag which is susceptible of a low cost of manufacture with regard to both materials and labor, and which accordingly is then susceptible of low prices of sale to the consuming public, thereby making such motor vehicle trash bag economically available to the buying public.

Still yet another object of the present invention is to provide a new motor vehicle trash bag which provides in the apparatuses and methods of the prior art some of the advantages thereof, while simultaneously overcoming some of the disadvantages normally associated therewith.

Still another object of the present invention is to provide a new motor vehicle trash bag for storing garbage that has accumulated in a vehicle.

Yet another object of the present invention is to provide a new motor vehicle trash bag which includes an interior frame member having a generally V-shaped cross-section. The interior frame member has an inverted generally U-shaped inner member. The inner member has a spring member disposed thereon. The interior frame member has an inverted generally U-shaped outer member. The outer member is secured to the spring member whereby the spring member biases the outer member outwardly with respect to the inner member. The inner member and the outer member each have a pair of clips disposed thereon. The pair of clips are adapted for holding a garbage liner therebetween in an open orientation. An exterior portion is dimensioned for receiving the interior frame member therein. The exterior portion is dimensioned for positioning beneath a seat of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
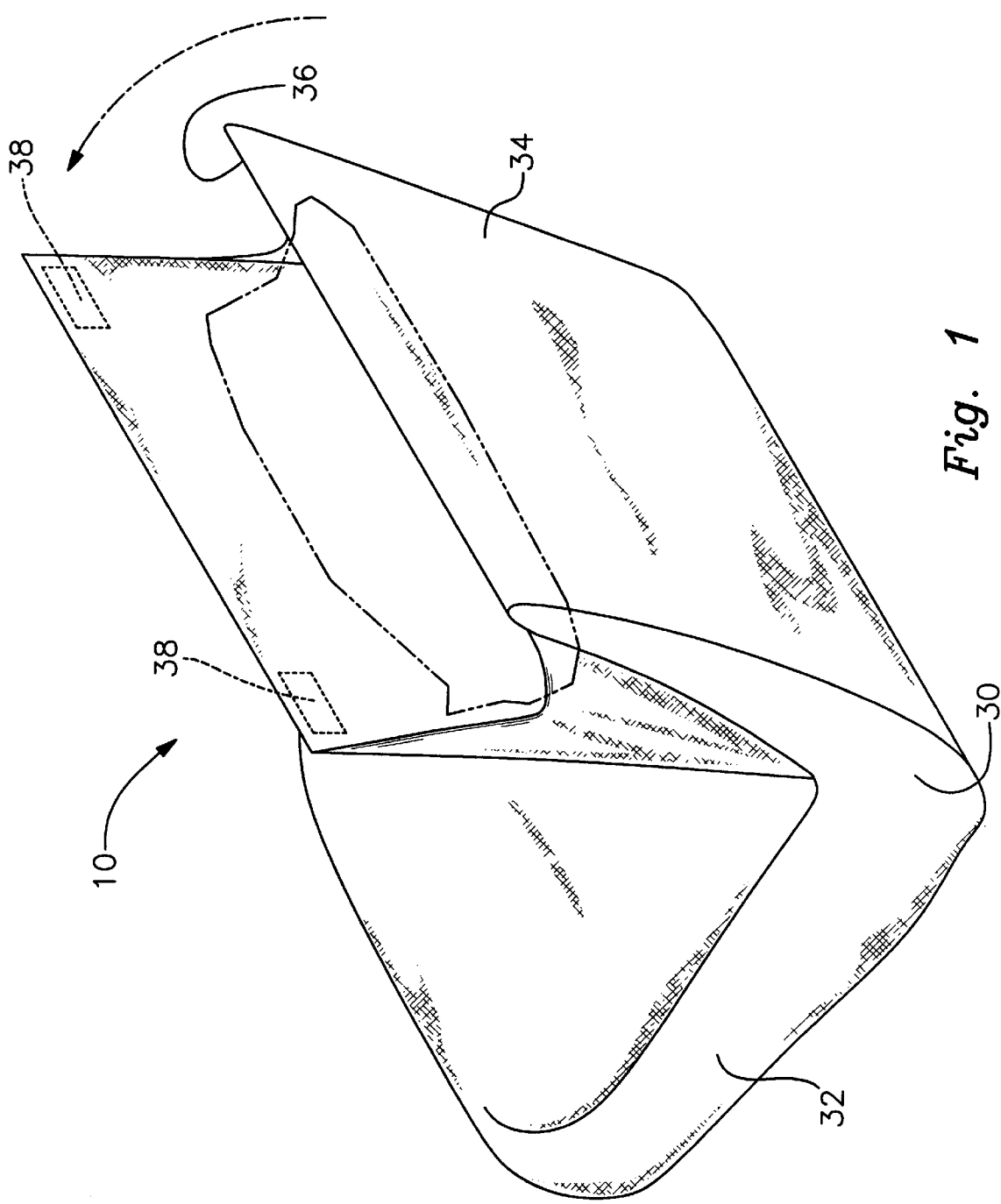
FIG. 1 is a perspective view of a new motor vehicle trash bag according to the present invention.
Figure 2:
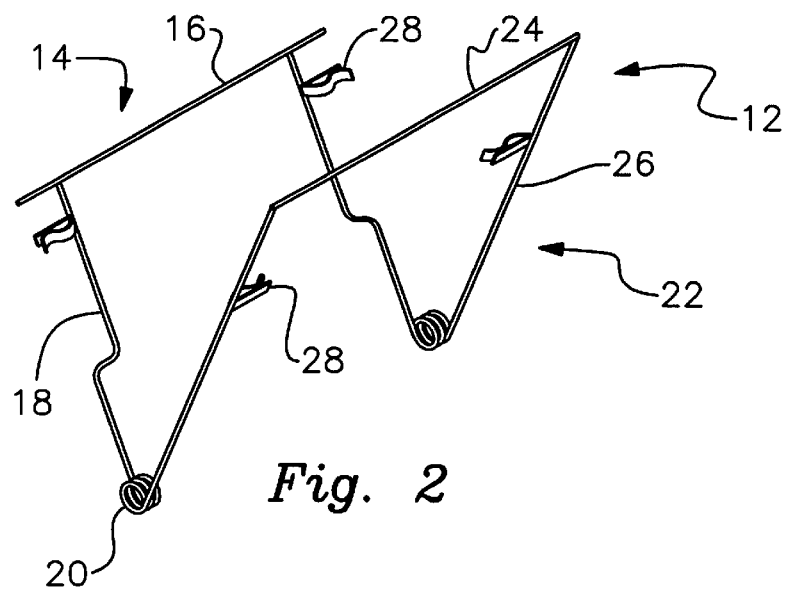
FIG. 2 is a perspective view of the interior frame of the present invention.
Figure 3:
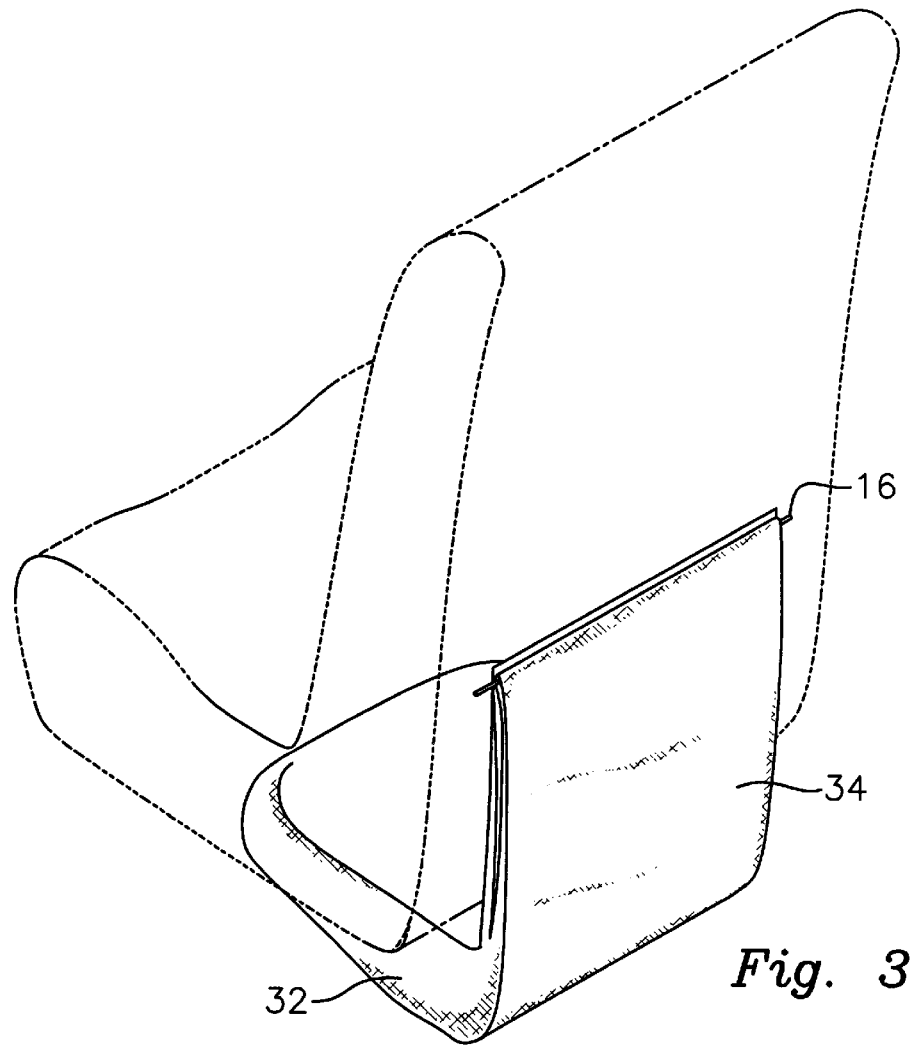
FIG. 3 is a perspective view of the present invention illustrated in use.

With reference now to the drawings, and in particular to FIGS. 1 through 3 thereof, a new motor vehicle trash bag embodying the principles and concepts of the present invention and generally designated by the reference numeral 10 will be described.

As best illustrated in FIGS. 1 through 3, the motor vehicle trash bag 10 comprises an interior frame member 12 having a generally V-shaped cross-section. The interior frame member 12 has an inverted generally U-shaped inner member 14. The inner member 14 has an upper horizontal segment 16 and a pair of downwardly extending side components 18. The side components 18 each have an upper portion and a lower portion. Each upper portion is positioned interiorly with respect to each lower portion. Free ends of the lower portion have a spring member 20 disposed thereon. The interior frame member 12 has an inverted generally U-shaped outer member 22. The outer member 22 has an upper horizontal segment 24 and a pair of downwardly extending linear side components 26. Free ends of the linear side components 26 are secured to the spring member 20 whereby the spring member 20 biases the outer member 22 outwardly with respect to the inner member 14. The inner member 14 and the outer member 22 each have a pair of clips 28 disposed on each of the side components thereof. The pair of clips 28 are adapted for holding a garbage liner therebetween in an open orientation.

An exterior portion 30 is dimensioned for receiving the interior frame member 12 therein. The exterior portion 30 has a generally L-shaped cross-section. The exterior portion 30 has a lower horizontal portion 32 and an upper vertical portion 34. The lower horizontal portion 32 is dimensioned for positioning beneath a seat of a vehicle. The upper horizontal portion 34 has an open upper end 36 leading into a hollow interior. The hollow interior houses the interior frame member 12 therein. The open upper end 36 has hook and loop fasteners 38 disposed on opposing sides thereof for closing the open upper end 36 and compressing the spring member 20 thereby pressing the outer member 22 against the inner member 14.

In use, the motorist would release the hook and loop fasteners 38 of the exterior portion 30 which will cause the spring member 20 to retract and thereby open the upper end 36 of the exterior portion 30 as well as expand the outer member 22 from the inner member 14. Thus, a garbage liner spanning the clips 28 of the interior frame member 12 would also open allowing for refuse to be deposited therein.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new motor vehicle trash bag for storing garbage that has accumulated in a vehicle comprising, in combination:

an interior frame member having a generally V-shaped cross-section, the interior frame member having an inverted generally U-shaped inner member, the inner member having a spring member disposed thereon, the interior frame member having an inverted generally U-shaped outer member, the outer member secured to the spring member whereby the spring member biases the outer member outwardly with respect to the inner member, the inner member and the outer member each having a pair of clips disposed thereon, the pair of clips adapted for holding a garbage liner therebetween in an open orientation; and an exterior portion dimensioned for receiving the interior frame member therein, the exterior portion dimensioned for positioning beneath a seat of a vehicle.

2. The motor vehicle trash bag as set forth in claim 1 wherein the exterior portion has a generally L-shaped cross-section, the exterior portion having a lower horizontal portion and an upper vertical portion, the lower horizontal portion dimensioned for positioning beneath a seat of a vehicle, the upper horizontal portion having an open upper end leading into a hollow interior, the hollow interior housing the interior frame member therein.

3. The motor vehicle trash bag as set forth in claim 2 wherein the open upper end has hook and loop fasteners disposed on opposing sides thereof for closing the open upper end and compressing the spring member thereby pressing the outer member against the inner member.

4. A new motor vehicle trash bag for storing garbage that has accumulated in a vehicle comprising, in combination:

an interior frame member having a generally V-shaped cross-section, the interior frame member having an inverted generally U-shaped inner member, the inner member having an upper horizontal segment and a pair of downwardly extending side components, the side components each having an upper portion and a lower portion, each upper portion being positioned interiorly with respect to each lower portion, free ends of the lower portion having a spring member disposed thereon, the interior frame member having an inverted generally U-shaped outer member, the outer member having an upper horizontal segment and a pair of downwardly extending linear side components, free ends of the linear side components secured to the spring member whereby the spring member biases the outer member outwardly with respect to the inner member, the inner member and the outer member each having a pair of clips disposed on each of the side components thereof, the pair of clips adapted for holding a garbage liner therebetween in an open orientation; and an exterior portion dimensioned for receiving the interior frame member therein, the exterior portion having a generally L-shaped cross-section, the exterior portion having a lower horizontal portion and an upper vertical portion, the lower horizontal portion dimensioned for positioning beneath a seat of a vehicle, the upper horizontal portion having an open upper end leading into a hollow interior, the hollow interior housing the interior frame member therein, the open upper end having hook and loop fasteners disposed on opposing sides thereof for closing the open upper end and compressing the spring member thereby pressing the outer member against the inner member.

* * * * *